US010419387B2

(12) United States Patent
Luo et al.

(10) Patent No.: US 10,419,387 B2
(45) Date of Patent: Sep. 17, 2019

(54) DOMAIN NAME RESOLUTION METHOD, SYSTEM, AND DEVICE

(71) Applicant: TENCENT TECHNOLOGY (SHENZHEN) COMPANY LIMITED, Shenzhen, Guangdong (CN)

(72) Inventors: Xijun Luo, Shenzhen Guangdong (CN); Jingtao Bai, Shenzhen Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 96 days.

(21) Appl. No.: 14/688,098

(22) Filed: Apr. 16, 2015

(65) Prior Publication Data

US 2015/0222590 A1  Aug. 6, 2015

Related U.S. Application Data

(63) Continuation of application No. PCT/CN2014/082365, filed on Jul. 17, 2014.

(30) Foreign Application Priority Data

Jul. 30, 2013 (CN) .......................... 2013 1 0325443

(51) Int. Cl.
*H04L 29/12* (2006.01)
*H04L 29/06* (2006.01)

(52) U.S. Cl.
CPC ...... *H04L 61/1511* (2013.01); *H04L 63/1458* (2013.01); *H04L 61/6004* (2013.01); *H04L 63/0236* (2013.01)

(58) Field of Classification Search
CPC ............. H04L 61/1511; H04L 63/1458; H04L 61/6004; H04L 63/0236

(Continued)

(56) References Cited

U.S. PATENT DOCUMENTS 7,620,733 B1   11/2009  Tzakikario et al.
8,261,351 B1 *  9/2012  Thornewell ......... H04L 61/1511
                                                         709/203

(Continued)

FOREIGN PATENT DOCUMENTS

CN      1756241 A      4/2006
CN    101321055 A  * 12/2008  ............. H04L 29/06

(Continued)

OTHER PUBLICATIONS

International Search Report, dated Oct. 24, 2014, pp. 1-4, issued in International Application No. PCT/CN2014/082365, State Intellectual Property Office of the P.R. China, Beijing, China.

(Continued)

*Primary Examiner* — Joseph L Greene
(74) *Attorney, Agent, or Firm* — Brinks Gilson & Lione

(57) ABSTRACT

A domain name resolution method may include sending, by user equipment, a first resolution request to a protection device. The method may include sending, by the protection device, a CNAME response to the user equipment in response to the first resolution request. The method may include sending, by the user equipment, the a second resolution request to the protection device. The second resolution request may include an identification information of the user equipment and a target domain name based on the CNAME response. The method may include validating, by the protection device, the identification information, and in response to successful validation, sending a third resolution request to a domain name server. The method may include determining, by the domain name server, that the third resolution request is sent by the protection device based on an indicator information, and in response, resolving, the target domain name in the third resolution request.

15 Claims, 5 Drawing Sheets

(58) Field of Classification Search
USPC .......................................................... 709/245
See application file for complete search history.

(56) References Cited

U.S. PATENT DOCUMENTS

| | | | |
|---|---|---|---|
| 8,863,288 B1* | 10/2014 | Savage | G06F 21/56 |
| | | | 713/188 |
| 2003/0070096 A1 | 4/2003 | Pazi et al. | |
| 2004/0250119 A1 | 12/2004 | Shelest et al. | |
| 2007/0112950 A1 | 5/2007 | Parsons | |
| 2010/0070448 A1* | 3/2010 | Omoigui | H01L 27/1463 |
| | | | 706/47 |
| 2010/0274668 A1* | 10/2010 | Langston | G06Q 30/02 |
| | | | 705/14.55 |
| 2011/0265181 A1 | 10/2011 | Jiang | |
| 2013/0145017 A1* | 6/2013 | Luna | H04W 4/18 |
| | | | 709/224 |
| 2013/0198065 A1* | 8/2013 | McPherson | H04L 61/1511 |
| | | | 705/40 |
| 2014/0173135 A1* | 6/2014 | Varney | H04L 67/289 |
| | | | 709/245 |

FOREIGN PATENT DOCUMENTS

| | | |
|---|---|---|
| CN | 101321055 A | 12/2008 |
| CN | 101841521 A | 9/2010 |
| CN | 102035809 A | 4/2011 |
| CN | 101789947 B | 10/2012 |

OTHER PUBLICATIONS

Second Office Action in China Application No. 201310325443.3, dated Dec. 12, 2018, pp. 1-11, including partial English Translation.
Office Action and Summary to corresponding Chinese Application No. 201310325443.3, dated Jun. 4, 2018, pp. 1-10.

* cited by examiner

DOMAIN NAME RESOLUTION METHOD, SYSTEM, AND DEVICE

This application is a continuation application of PCT/CN2014/082365 filed on Jul. 17, 2014, which claims priority to Chinese patent application No. 201310325443.3, titled "DOMAIN NAME RESOLUTION METHOD, SYSTEM AND DEVICE", filed with the State Intellectual Property Office on Jul. 30, 2013, which are incorporated herein by reference in their entireties.

FIELD

The disclosure relates to internet technology, and particularly to a domain name resolution method, system, and device.

BACKGROUND

In a conventional method for blocking a malicious attack on a communication network, such as a computer network like the internet, user equipment such as a communication device may transmit a resolution request to a protection device twice. The protection device may transmit a canonical name (CNAME) response twice, in response to the respective resolution requests. Resolution software in the user equipment may identify the two CNAME responses as a resolution loop. Therefore, the user equipment may only respond to the first CNAME response, and may not respond to the second CNAME response, resulting in a failure in a name resolution. Hence the domain name resolution in the above technical solution has a low success rate.

SUMMARY

A domain name resolution method, a domain name resolution system and a domain name resolution device are provided according to embodiments of the disclosure, which may improve the success rate of the domain name resolution.

A first aspect may include a domain name resolution method, including receiving, by a protection device a first domain resolution request from a communication equipment. The domain name resolution method also includes sending, by the protection device, a canonical name (CNAME) response to the communication equipment in response to the first resolution request. The domain name resolution method also includes receiving, by the protection device, a second resolution request from the communication equipment, where the second resolution request is based on the CNAME response and includes an identification information of the communication equipment and a target domain name. The domain name resolution method also includes validating, by the protection device, the identification information in the second resolution request. The domain name resolution method also includes sending, by the protection device, a third resolution request for receipt by a domain name server, in response to the identification information in the second resolution request passing the validation. The third resolution request may include an indicator information, the identification information, and the target domain name. The indicator information may identify that the third resolution request is sent by the protection device. The method may include receiving, by the protection device, from the domain name server, a network address of the target domain name included in the third resolution request, said network address received in response to the third resolution request sent by the protection device based on the indicator information.

In a second aspect a domain name resolution system, including a client equipment, a protection device, and a domain name server is described. The client equipment may send a first resolution request for receipt by the protection device. The protection device may send a canonical name (CNAME) response for receipt by the client equipment in response to the first resolution request. The client equipment may send a second resolution request for receipt by the protection device, where the second resolution request includes identification information of the client equipment and a target domain name based on the CNAME response from the protection device. The protection device may validate the identification information in the second resolution request, and send a third resolution request for receipt by the domain name server in response to the identification information in the second resolution request being successfully validated, where the third resolution request includes an indicator information, the identification information, and the target domain name, and the indicator information identifies that the third resolution request is sent by the protection device. The domain name server may determine that the third resolution request is sent by the protection device based on the indicator information, and resolve the target domain name in the third resolution request.

In a third aspect a domain name resolution device may include a receiving unit, a constructing unit, a validating unit, and a sending unit. The receiving unit may receive a first resolution request sent by a client equipment. The domain name resolution device also includes the constructing unit that may send a canonical name (CNAME) response for receipt by the client equipment in response to the first resolution request. The domain name resolution device also includes the validating unit that may receive a second resolution request sent by the client equipment in response to the CNAME response, and to validate an identification information in the second resolution request, where the second resolution request includes the identification information of the client equipment and a target domain name. The domain name resolution device also includes the sending unit that may send a third resolution request, for receipt by a domain name server, in response to the identification information in the second resolution request being successfully validated, where the third resolution request includes an indicator information, the identification information, and the target domain name, and where the indicator information identifies that the third resolution request is sent by the domain name resolution device. The domain name server may determine that the third resolution request is sent by the domain name resolution device based on the indicator information, and in response resolves the target domain name in the third resolution request.

In the technical solutions described throughout this document, the protection device only needs to transmit one CNAME response to the user equipment. In this way, the user equipment may receive only one CNAME response, which may solve the problem in the conventional technology that the user equipment may receive at least two CNAME responses and only respond to a first CNAME response and may not respond to a second CNAME response. Therefore, the success rate of the domain name resolution may be improved by the technical solutions described throughout this document.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views. For those with ordinary skills in the art, other drawings may be gained based on these drawings without any creative work.

DETAILED DESCRIPTION

In an example, a user equipment may send a domain name resolution request to a protection device. The user equipment may be an apparatus, a device, a communication equipment, or a client equipment with a communication function. For example, the user equipment may be a tablet computer, a cell phone, an electronic reading device, a remote controller, a personal computer (PC), a notebook computer, a vehicle device, a network television, a wearable device or other communication device that is communicable over a network.

The domain name resolution request, or a domain resolution request, or simply a resolution request may be a first resolution request by the user equipment. The first resolution request may include a domain name to be resolved. The domain name may be an identifier of one or more network addresses, such as a server, a web-portal, a website, or any other networked device. For example, the domain name may be a sequence of alphanumeric characters (such as 'google.com', or 'Merriam-Webster.com') that specifies a group of online resources (as of a particular company or person) that forms part of the corresponding Internet addresses. The resolution request may request access to the network address corresponding to the domain name included in the resolution request. If the domain name of the first resolution request is www.example.com, the first resolution request may include 'www.example.com'. A second resolution request may be generated in response to a Canonical Name record (CNAME) response. The user equipment may receive the CNAME response in response to the first resolution request. The CNAME request may provide a target domain name corresponding to the domain name requested by the first resolution request. The second resolution request may be a resolution request including identification information and the target domain name. For example, if the target domain name is www.example.com and the identification information is xyz, the second resolution request may include xyz.www.example.com.

The CNAME record is a type of resource record in the Domain Name System (DNS) used to specify that a domain name is an alias for another domain, the "canonical" domain. All information, including subdomains, IP addresses, etc., is defined by the canonical domain.

Figure 1:
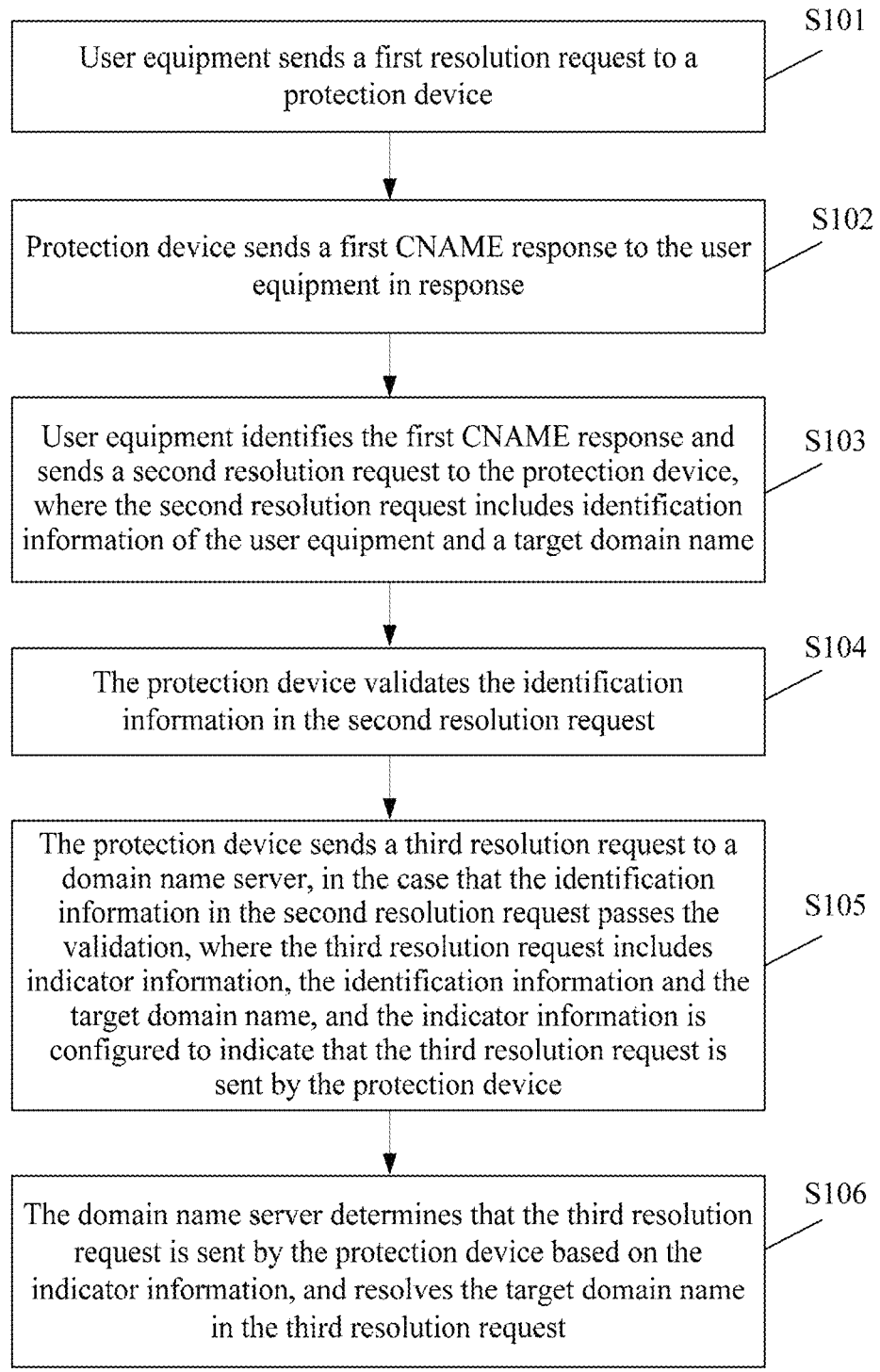
FIG. 1 illustrates an example method for a domain name resolution.

FIG. 1 illustrates a domain name resolution method. As shown in FIG. 1, the method includes at least steps S101-S106.

In S101, the user equipment may send a first resolution request for receipt by a protection device. The first resolution request may include a domain name, such as "bar.example.com."

In S102, the protection device may send a CNAME response to the user equipment in response to the first resolution request. The CNAME response may include the canonical name to which the domain name points to, such as "foo.example.com." In this example, "bar.example.com" is supposed to be directed to "foo.example.com." The protection device may be a DNS resolver, such as a DNS client. For example, the protection device may be a client application such as a web browser or an e-mail client, or a DNS application such as BIND. The protection device may send DNS messages to obtain information about the requested domain name space. For example, the protection device may send a DNS query to a domain name server (DNS server) requesting information in response to a domain name resolution from the user equipment.

In S103, the user equipment may identify the CNAME response and may send a second resolution request to the protection device. The second resolution request may include identification information of the user equipment and a target domain name. The target domain name may be the domain name "bar.example.com" or the canonical domain name "foo.example.com."

In S104, the protection device may validate the identification information in the second resolution request.

In S105, the protection device may send a third resolution request to a domain name server, if the identification information in the second resolution request passes the validation. The third resolution request may include an indicator information, the identification information, and the target domain name. The indicator information may indicate that the third resolution request is sent by the protection device.

In S106, the domain name server may determine that the third resolution request is sent by the protection device based on the indicator information. The domain name server may resolve the target domain name in the third resolution request.

Figure 2:
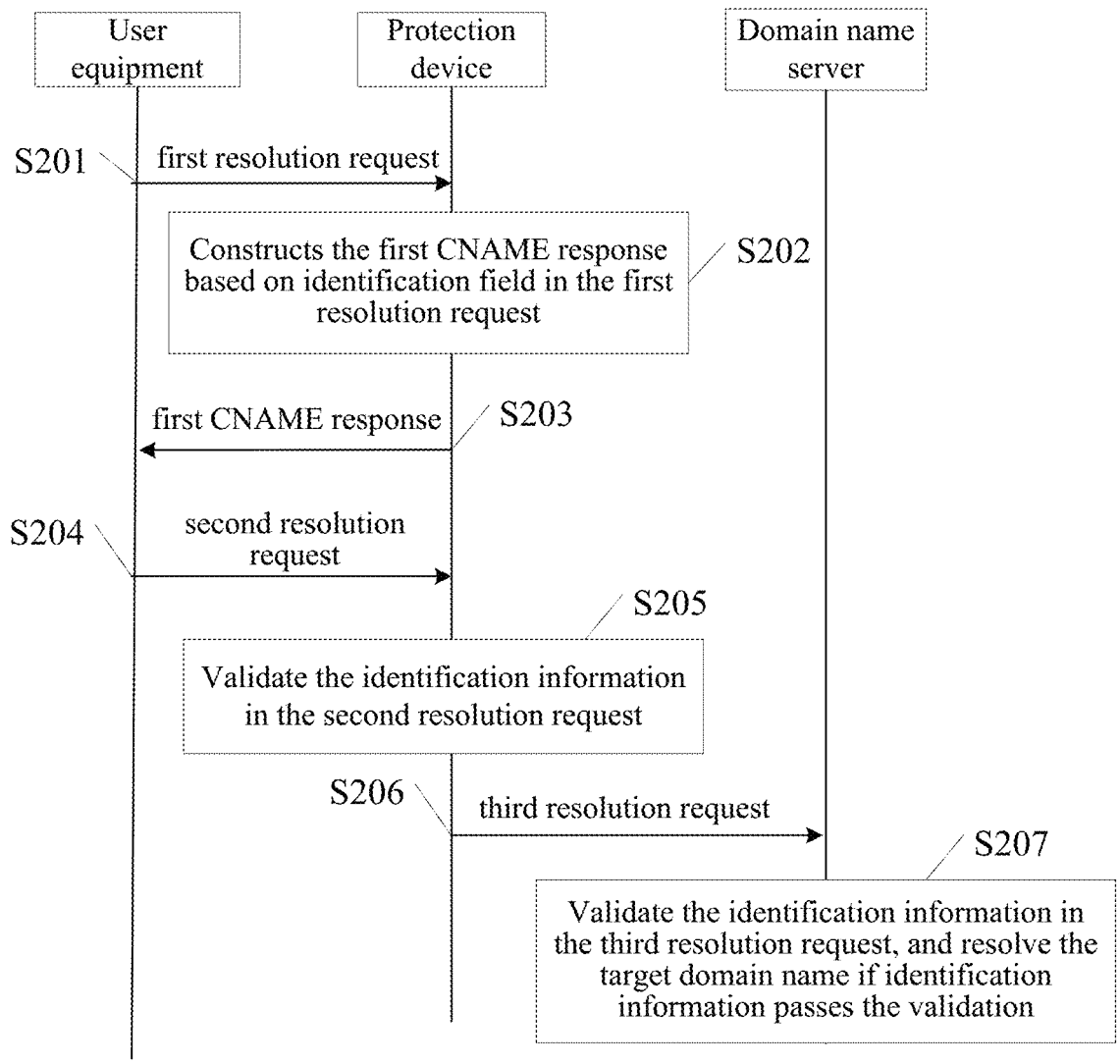
FIG. 2 illustrates an example method for a domain name resolution.

FIG. 2 illustrates an example domain name resolution. As shown in FIG. 2, the method may include at least the steps S201-S207.

In S201, the user equipment may transmit a first resolution request for a target domain name to a protection device. The first resolution request may include an identification field for identifying the user equipment.

The identification field in the first resolution request may include a source IP address, for example, an IP address of the user equipment. Other examples may use different information in the identification field. For example, the identification field may also include user equipment identification information such as a serial number, a media access controller (MAC) address or other information for identifying the user equipment.

In S202, the protection device may perform a hashing algorithm using the identification field to obtain identification information. The protection device may construct the CNAME response that includes the identification information and the target domain name.

The identification information may be a cookie. For example, in a case that the target domain name is www.exampleexample.com, the CNAME response may be cookie.www.exampleexample.com. The cookie may be a hypertext transfer protocol (HTTP) cookie web cookie, Internet cookie, or browser cookie. The cookie may be a small piece of data stored on the user equipment.

In S203, the protection device may send the CNAME response to the user equipment. For example, the protection device may send the cookie in response to the first resolution request from the user equipment.

In S204, the user equipment may identify the CNAME response and send a second resolution request to the protection device.

After receiving the CNAME response, the user equipment may generate a second resolution request. The second resolution request may include the CNAME response, such as the cookie.www.example.com.

In S205, the protection device may validate the identification information in the second resolution request.

In S206, the protection device may send a third resolution request including indicator information to a domain name server, if the identification information in the second resolution request passes the validation. The indicator information may identify that the third resolution request is sent by the protection device.

The indicator information may be indicated by a reserved bit of a header identification field in position request protocol. For example, if the reserved bit of the header identification field in position request protocol is '1', it may identify that the third resolution request is sent to the domain name server by the protection device.

In S207, the domain name server may validate the identification information in the third resolution request based on the indicator information. The domain name server may resolve the target domain name in the third request, if the identification information in the third resolution request passes the validation.

The domain name server may determine that the third resolution request is sent by the protection device based on the received indicator information. The domain name server may resolve the target domain name in the third request if the identification information in the third resolution request passes the validation. The domain name server may thus, ensure that only a resolution request sent by the protection device is resolved. Accordingly, a malicious attack, such as a distributed denial of service (DDOS) attack, which may be sent by an attacking device, are not transmitted through to the domain name server. Thus, the resolution request sent by other devices (such as the attacking device) to the domain name server may not be resolved. Further, the attacking device may not respond to the CNAME response sent by the protection device. For example, an attacking device may not transmit the second resolution request in response to the CNAME response from the protection device. Accordingly, a malicious attack on the domain server may be blocked.

For example, in the step S202, consider that the protection device receives a DDOS attack from an attacking device. In this case, the protection device may not identify that the request is the first resolution request or the DDOS attack. The protection device may send a respective CNAME response in response to each resolution request as described elsewhere in this document irrespective of whether the received resolution request is the first resolution request or the DDOS attack. Accordingly, the user equipment and the attacking device may both receive the corresponding CNAME response. However, the attacking device may not respond to the CNAME response. For example, the attacking device may not transmit the second resolution request in response to the CNAME response from the protection device. However, the user equipment may send a resolution request (such as the second resolution request) to the protection device after receiving the corresponding CNAME response. Thus, the sequence of operations described is not complete and accordingly the malicious attack on the domain server is blocked.

In an example, the method may further include adding, by the protection device, the identification field into a white list. For example, the protection device may add the identification field in a white list when the identification information in the second resolution request passes the validation. The next time when the user equipment sends a resolution request to the protection device, the protection device may determine whether the identification field in the received resolution request matches an identification field in the white list. If the identification field in the resolution request matches an identification field in the white list, the protection device may deem that the resolution request is not a malicious attack and proceed to send the third resolution request to the domain server. Else, the protection device may perform S205 to validate the identification information in the received resolution request.

The protection device may validate the identification information in the second resolution request based on hashing. For example, the validation may include performing, by the protecting device, a hashing algorithm using the identification information in the second resolution request to obtain a hash result. The protection device may deem that the identification information in the second resolution request passes the validation if the hash result matches the identification field.

The domain name server may validate the identification information in the third resolution request based on hashing using the indicator information. For example, the validation by the domain name server may include performing, by the domain name server, a hashing algorithm using the identification information in the third resolution request based on the indicator information, to obtain a hash result. The domain name server may deem that the identification information in the third resolution request passes the validation, if the hash result matches the identification field. The hash algorithm may be negotiated in advance by the domain name server and the protection device.

The domain name server may be an authoritative domain name server. The authoritative server may provide an actual IP address of the target domain name that the user equipment wants to resolve, such as a mail server IP address or web site IP address. The domain name server may also be a recursive resolver domain name server. The domain name server may provide a resource record according to the DNS protocol to identify the actual IP address of the target domain name.

In the above technical solutions, the protection device may send only one response, such as the CNAME response, to the user equipment in order to prevent a malicious attack on the domain name server. The user equipment may receive only one CNAME response, such as the CNAME response. The described technical solutions, thus, solve the problem in the conventional technology that the user equipment receives at least two CNAME responses and only responds to a first CNAME response and without responding to a second CNAME response. Therefore, the success rate of the domain name resolution may be improved.

Figure 3:
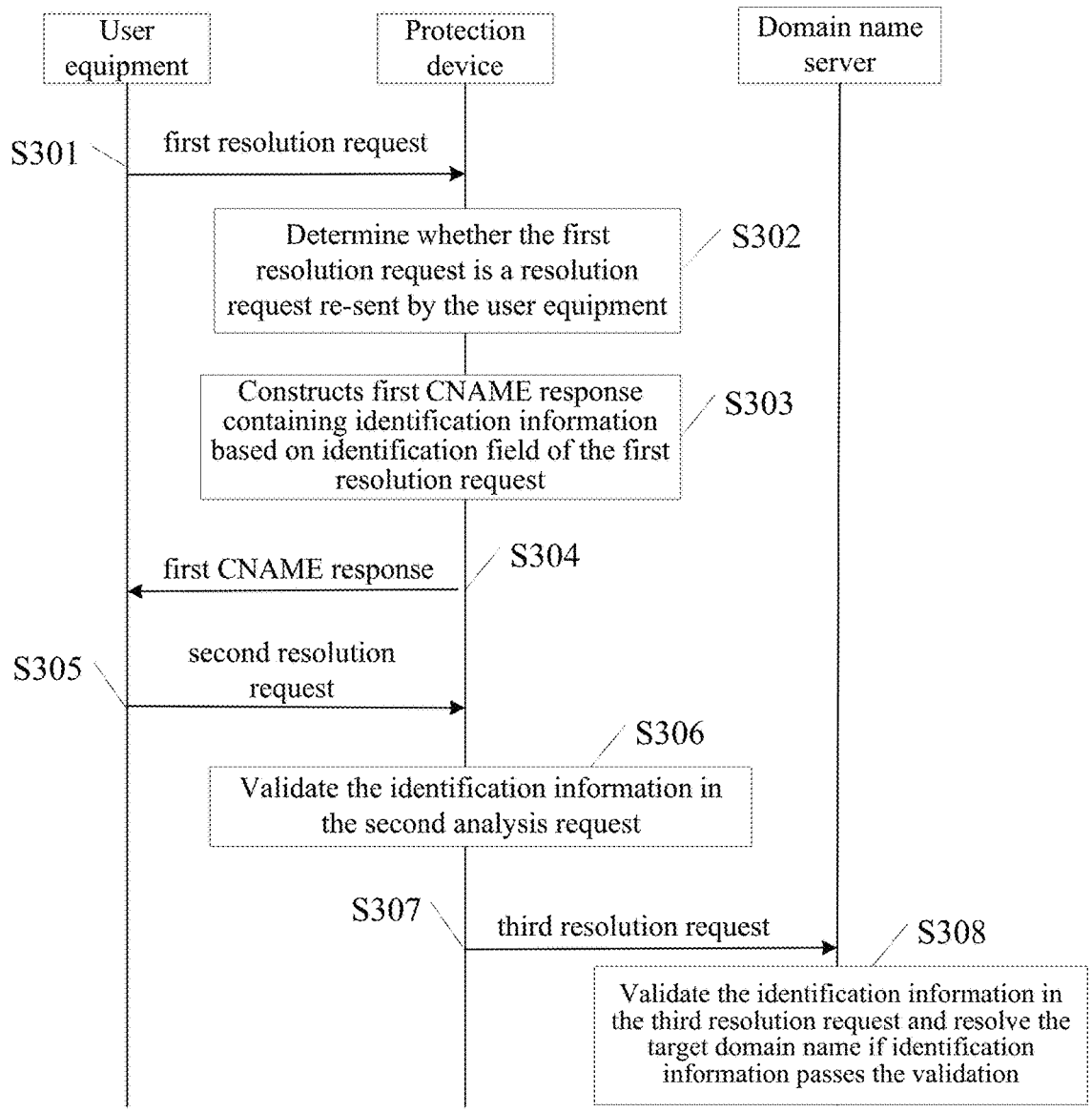
FIG. 3 illustrates an example method for a domain name resolution.

FIG. 3 illustrates a method for domain name resolution. As shown in FIG. 3, the method may include at least steps S301-S308.

In S301, a user equipment may send a first resolution request for a target domain name for receipt by a protection device. The first resolution request may include an identification field for identifying the user equipment.

In S302, the protection device may determine whether the first resolution request is a resolution request re-sent by the user equipment. The protection device may perform the step S303 if the first resolution request is a resolution request re-sent by the user equipment; else, if this is a first instance of the first resolution request received from the user equipment, the protection device may not take any action in response.

The protection device may determine whether the first resolution request is a resolution request re-sent by the user equipment by monitoring duration between successive resolution requests received from the user equipment. For example, the protection device may calculate duration between a time point at which the first resolution request from the user equipment is received and a time point at which the first resolution request previously sent by the user equipment is received. The protection device may determine if the calculated duration is smaller than a pre-determined threshold. If the calculated duration is smaller than the pre-determined threshold, the protection device may deem the first resolution request as being a resolution request re-sent by the user equipment. Alternatively, the protection device may deem that the first resolution request is not being re-sent by the user equipment.

For example, the user equipment may transmit a resolution request, such as the first resolution request twice. The user equipment may transmit the two resolution requests within a short interval of each other. For example, the user equipment may transmit the first resolution request for receipt by the protection device twice, the two transmissions within the predetermined threshold. The predetermined threshold may be a duration such as 0.1 micro-seconds, or 0.1 nano-seconds, or any other time interval. Determining whether the first resolution request is a re-sent resolution request may improve security of the method.

In S303, the protection device may construct a CNAME response to send to the user equipment in response to the re-sent first resolution request. The CNAME response may contain identification information of the user equipment. The protection device may acquire the identification information by performing a hashing algorithm based on the identification field in the re-sent first resolution request. The protection device may construct the CNAME response including the acquired identification information and the target domain name.

The identification field in the first resolution request may be a source IP address, such as an IP address of the user equipment. Alternatively or in addition, the identification field may include user equipment identification number, MAC address, or other information for uniquely identifying the user equipment.

The identification information may be a cookie, such as an HTTP cookie, web-cookie, or other type of information carrying mechanism. For example, in case the target domain name is www.example.com, the CNAME response may be cookie.www.example.com, which includes the identification information (cookie) and the target domain name (www.example.com).

In S304, the protection device may send the CNAME response to the user equipment.

In S305, the user equipment may identify the CNAME response and send a second resolution request to the protection device in response to the CNAME response.

In the step S305, after receiving the CNAME response, the user equipment may generate the second resolution request containing the CNAME response. For instance, continuing the above example, the second resolution request may include the cookie.www.example.com received from the protection device.

In S306, the protection device may validate the identification information in the second resolution request.

In S307, the protection device may send a third resolution request carrying indicator information to a domain name server, if the identification information in the second resolution request passes the validation. The indicator information may identify that the protection device is the source of the third resolution request.

The indicator information may be provided by a reserved bit of a header in the identification field of the third resolution request. Alternatively or in addition, the reserved bit position may be according to a protocol used to send the third resolution request. For example, if the reserved bit is set to value '1', it may indicate that the protection device sent the third resolution request to the domain name server. In another example, such a conclusion may be reached based on the reserved bit being set to value '0' (zero).

In S308, the domain name server may validate the identification information in the third resolution request based on the indicator information, and may resolve the target domain name in the third resolution request if the identification information in the third resolution request passes the validation.

The domain name server may determine that the third resolution request is sent by the protection device based on the indicator information, upon receiving the indicator information. The domain name server may resolve the target domain name in the third resolution request if the identification information in the third resolution request passes the validation. In this way, the domain name server may only resolve the resolution request sent by the protection device. Thus, the domain name server may avoid, or be protected against a malicious attack (such as a DDOS attack) sent by an attacking device. The domain name server may detect that a resolution request is being sent from an unidentified device, such as the attacking device, and not through the protection device. The resolution request sent by other devices, such as the attacking device to the domain name server may not be resolved. In addition, the attacking device may not respond to a CNAME response sent by the protection device, and therefore, the attacking device may not transmit a resolution request in response to the CNAME response sent by the protection device. Thus a malicious attack from the attacking device may be blocked and prevented.

In an example, the method may further include adding, by the protection device, the identification field into a white list, when the identification information in the second resolution request from the user equipment passes the validation. The protection device may use the white list when the user equipment sends a next resolution request. The protection device may determine whether the identification field in the next resolution request matches an identification field in the white list. The protection device may determine that the next resolution request is not a malicious attack when the identification field in the next resolution request matches an identification field in the white list, without performing a validation; else, the protection device may perform the validation of the next resolution request according to the method described in an earlier example.

The protection device may validate the identification information in the second resolution request based on hashing. The validation, for example, may include performing, by the protection device, a hashing algorithms using the identification information in the second resolution request to calculate a hash result. The protection device may determine whether the hash result matches the identification field in the second resolution request. If a successful match is detected, the protection device may deem that the validation passed successfully, else the validation is considered to have failed.

In an example, the protection device may transmit a resolution result to the user equipment when the domain server successfully resolves the target domain name.

The above technical solution further includes determining whether the first resolution request is a resolution request that is re-sent by the user equipment, which not only improves the success rate of domain name resolution, but also improves the security of the domain name resolution.

Figure 4:
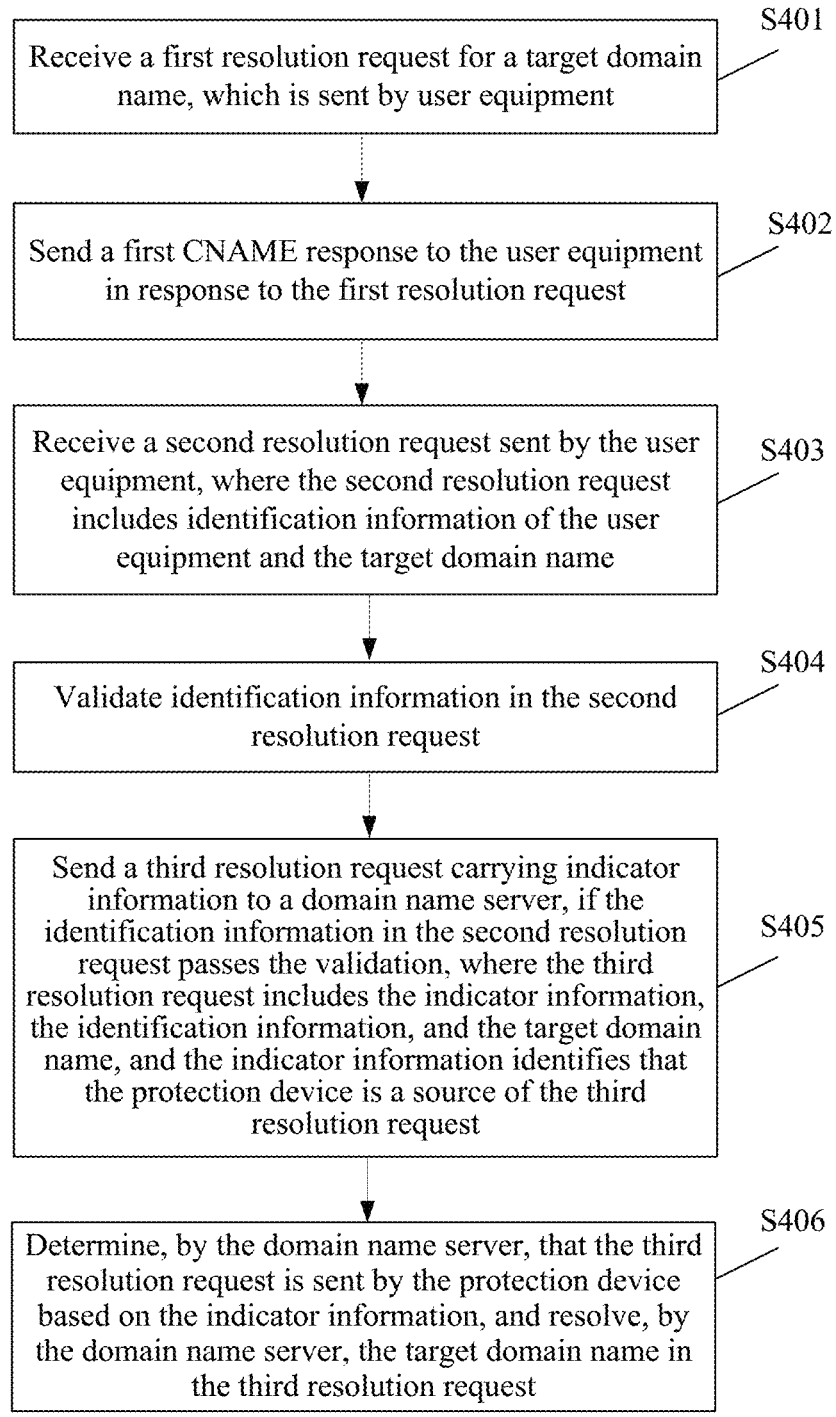
FIG. 4 illustrates an example method for a domain name resolution.

FIG. 4 illustrates a method for a domain name resolution. As shown in FIG. 4, the method may include at least steps S401-S406. The method may be performed by a protection device.

S401 may include receiving the first resolution request for a target domain name. The first resolution request may be sent by the user equipment.

The first resolution request may contain an identification field for identifying the user equipment. In addition, Step S401 may further include performing a hashing algorithm using the data in the identification field to obtain identification information.

For example, the data in identification field of the first resolution request may be a source IP address, for example, an IP address of the user equipment. In another example, the identification field may additionally or alternatively include user equipment identification information such as a serial number, a MAC address, or other information for uniquely identifying the user equipment.

S402 may include sending a first CNAME response to the user equipment in response to the first resolution request.

The step S402 may further include constructing the CNAME response. The CNAME response may include the identification information and the target domain name. S402 may also include sending the CNAME response to the user equipment. The protection device may receive a second resolution request from the user equipment in response to the CNAME response.

The identification information may be a cookie, such as an HTTP cookie, internet cookie, or any other type of cookie. For example, if the target domain name is www.example.com, the CNAME response may be a cookie for www.example.com, such as cookie.www.example.com.

Upon receiving the CNAME response, the user equipment may generate a second resolution request that includes the CNAME response, such as the cookie.www.example.com.

S403 may include receiving a second resolution request sent by the user equipment. The second resolution request may include identification information of the user equipment and the target domain name.

S404 may include validating the identification information in the second resolution request.

S405 may include sending a third resolution request carrying indicator information to a domain name server, if the identification information in the second resolution request passes the validation. The third resolution request may include the indicator information, the identification information, and the target domain name. The indicator information may identify the protection device as the source of the third resolution request.

S406 may include determining, by the domain name server, that the third resolution request is sent by the protection device based on the indicator information. S406 may further include resolving, by the domain name server, the target domain name in the third resolution request.

The indicator information may be a reserved bit of the header identification field in the third resolution request. The reserved bit may be at a predetermined position according to a protocol used by a resolution request. For example, the reserved bit being set to 1 may indicate that the third resolution request is sent by the protection device to the domain name server. Alternatively, the reserved bit being set to 0 may indicate the source of the third resolution request being the protection device.

The domain name server may determine that the third resolution request is sent by the protection device based on the indicator information, upon receiving the indicator information. The domain name server may resolve the target domain name in the third request if the identification information in the third resolution request passes the validation. Accordingly, the domain name server may only resolve the resolution request that is sent by the protection device. In case of a malicious attack (such as a DDOS attack) sent by an attacking device, the domain name server may detect that the resolution request is not being transmitted through the protection device. Thus, the resolution request sent by other devices (such as the attacking device) to the domain name server may not be resolved. Since the attacking device may not respond to a CNAME response sent by the protection device, consequently, the attacking device may not transmit a resolution request in response to the CNAME response sent by the protection device. Thus, a malicious attack may be blocked by the above example domain name resolution method.

In an example, the step S401 may include:

receiving a first resolution request for a target domain name, where the first resolution request is sent by a user equipment; and determining whether the first resolution request is re-sent by the user equipment; and performing a hashing algorithm using the identification field to obtain identification information.

The step of determining whether the first resolution request is re-sent by the user equipment may include calculating a time period from a receiving time point of the first resolution request to a receiving time point of the first resolution request previously sent by the user equipment, and determining whether the calculated time period is smaller than a pre-determined threshold. If the time period is smaller than the pre-determined threshold, the first resolution request may be considered to be re-sent by the user equipment. Else, the first resolution request may not be a resolution request that is re-sent by the user equipment.

The user equipment, for example, may transmit a resolution request to a protection device twice within a short time period, such as, within the threshold. For example, the threshold may be in seconds, milliseconds, microseconds, nanoseconds, or any other unit of time. The security of domain resolution may be improved through the described process to determine whether the resolution request is a re-sent resolution request from the user equipment.

In another example, the method may additionally include adding the identity field into a white list, in response to the identification information in the second resolution request being successfully validated.

The protection device, upon receiving a next resolution request from the user equipment, may determine whether the identification field in the next resolution request matches an identification field in the white list. If the identification field in the next resolution request matches an identification field in the white list, the resolution request may be considered safe, and not a malicious attack. Else, the protection device may validate the next resolution request as described throughout this document.

The step of validating the identification information in the second resolution request may include:

performing a hashing algorithm using the identification information in the second resolution request to obtain a hash result, and determining that the identification information in the second resolution request passes the validation if the hash result matches with the identification field.

In an example, the method may be applied to a protection device, such as the protection device may implement the above method.

The domain name server may be an authentic domain name server.

In the above technical solution, only the single CNAME response is sent to the user equipment and the user equipment may receive only one CNAME response, which therefore may solve the problem that the user equipment may only respond to a first CNAME response and may not respond to a second CNAME response upon receipt of at least two CNAME responses. Therefore, the success rate of the domain name resolution may be improved by the above technical solution.

Examples of a device are described further. The example devices may implement the example methods described throughout this document.

Figure 5:
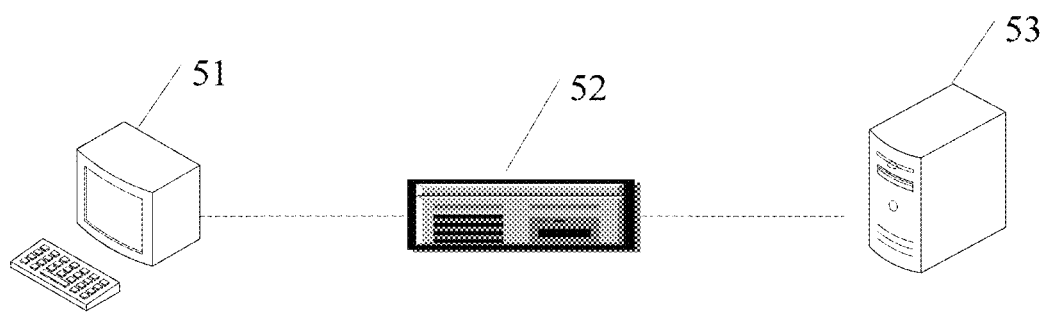
FIG. 5 illustrates a structural view of an example domain name resolution system.

FIG. 5 illustrates a structural view of a domain name resolution system. As shown in FIG. 5, the system may include a user equipment 51, a protection device 52, and a domain name server 53.

The user equipment 51 may send a first resolution request to the protection device 52. The first resolution request may be a DNS protocol message. The first resolution request may be a request to resolve a domain name, such as bar.example.com.

The first resolution request may include an identification field for identifying the user equipment. For example, the identification field may include a source IP address, such as an IP address of the user equipment 51. Alternatively or in addition, the identification field may include identification information of the user equipment 51 such as a MAC address, serial number, or other information for uniquely identifying the user equipment 51.

The protection device 52 may send a first canonical name (CNAME) response to the user equipment 51 in response to the first resolution request.

The first CNAME response may include identification information obtained by performing a hashing algorithm using the identification field. The CNAME response may include a target domain name in addition to the identification information. For example, the target domain name may be a canonical name for the domain name requested by the user equipment. The identification information may be cookie. For example, in case the target domain name is www.example.com, the CNAME response may be cookie.www.example.com.

The user equipment 51 may identify the CNAME response, and send a second resolution request to the protection device in response to the CNAME response. The second resolution request may include the identification information of the user equipment and the target domain name. The identification information in the second resolution request may be from the CNAME response received from the protection device.

For example, after receiving the CNAME response, the user equipment 51 may generate the second resolution request including the CNAME response, such as including cookie.www.example.com.

The protection device 52 may validate the identification information in the second resolution request and send a third resolution request to the domain name server 53 upon successful validation of the identification information in the second resolution request. The third resolution request may include indicator information, the identification information, and the target domain name. The indicator information may identify that the third resolution request is sent by the protection device 52.

The indicator information may be indicated by a reserved bit position of a header in the identification field. For example, the reserved bit position may be defined by a communication protocol used, such as the DNS protocol. For example, if the reserved bit is set to 1, it may indicate that the third resolution request is sent by the protection device 52 to the domain name server 53. Alternatively, the reserved bit being set to 0 may indicate the source of the third resolution request being the protection device 52.

The domain name server 53 may determine that the third resolution request is sent by the protection device 52 based on the indicator information, and resolve the target domain name in the second request.

The domain name server 53 may determine that the third resolution request is sent by the protection device 52 based on the indicator information, once the indicator information is received. The domain name server 53 may resolve the target domain name in the third request if the identification information in the third resolution request passes the validation. Accordingly, the domain name server 53 may only resolve the resolution request that is sent by the protection device 52. In case of a malicious attack (such as a DDOS attack) sent by an attacking device, the domain name server 53 may detect that the resolution request is not being transmitted through the protection device 52. Thus, the resolution request sent by other devices (such as the attacking device) to the domain name server 53 may not be resolved. Since the attacking device may not respond to a CNAME response sent by the protection device 52, consequently, the attacking device may not transmit a resolution request in response to the CNAME response sent by the protection device 52. Thus, a malicious attack may be blocked by the above example domain name resolution system.

For example, the protection device 52 may also receive a DDOS attack sent by an attacking device when receiving the first resolution request. In this case, the protection device 52 is not in a position to identify whether a received request is the non-malicious first resolution request or the malicious DDOS attack. The protection device 52 may send a CNAME response in response to both requests (including the first resolution request and the DDOS attack). That is, the user equipment 51 and the attacking device may both receive the CNAME response. However, the attacking device may not respond to the received CNAME response, and thus, may not transmit a second resolution request in response to the CNAME response sent by the protection device 52. However, the user equipment 51 may send a second resolution request to the protection device 52 after receiving the CNAME response. In this way, the malicious attack may be blocked.

In an example, the protection device 52 may determine whether the first resolution request is being re-sent by the user equipment 51 and, in such a case, may perform the hashing algorithm using the identification field. The protection device 52 may identify the user equipment 51 in the first resolution request and obtain the identification information, if the first resolution request is a resolution request that is re-sent by the user equipment 51.

The protection device 52 may calculate a time period from a receiving time point of the first resolution request to a receiving time point of the first resolution request previously sent by the user equipment 51. If the calculated time period is smaller than a pre-determined threshold, the protection device 52 may consider that the first resolution request is being re-sent by the user equipment 51 and take the further steps; else, the protection device 52 may consider that the first resolution request is not a re-sent request from the user equipment 51.

In an example, the user equipment 51 may transmits a resolution request to a protection device 52 twice within a short time period. For example, the user equipment 51 may transmit twice the first resolution request to the protection device 52 within the time period indicated by the threshold. The security of the domain name resolution may be improved by the above process.

In another example, the protection device 52 may add the identification field into a white list when the identification information in the second resolution request passes the validation. In this way, it may be determined directly whether the identification field in the resolution request matches an identification field in the white list, when the user equipment 51 sends a next resolution request. It may be determined that the resolution request is not a malicious attack, if the identification field in the next resolution request matches an identification field in the white list, and the protection device 52 may skip the validating the next resolution request; else, the protection device 52 may to validate the next resolution request to ensure that the next resolution request is not a malicious attack.

In an example, the protection device 52 may perform hashing algorithms using the identification information in the second resolution request, to obtain a hash result. The protection device 52 may validate the second resolution request by comparing the identification information in the second resolution request with the hash result. If the hash result matches with the identification field, the second resolution request may be considered valid, else the second resolution request may be considered invalid.

In another example, the domain name server 53 may perform the hashing algorithm using the identification information in the third resolution request to obtain a hash result. The domain name server 53 may validate the identification information in the third resolution request by comparing the identification field with the hash result. If the hash result matches with the identification field, the third resolution request may be considered valid, else the third resolution request may be considered invalid. The domain name server 53 and the protection device 52 may predetermine the hash algorithm used by the domain name server 53.

In an example, the domain name server 53 may be an authoritative domain name server.

In the above technical solutions, the protection device may only send the single CNAME response, to the user equipment. In this way, the user equipment may receive only one CNAME response, which may solve the problem in the conventional technology that the user equipment may receive at least two CNAME responses and only respond to a first CNAME response and may not respond to a second CNAME response. Therefore, the success rate of the domain name resolution may be improved in the above technical solutions.

Figure 6:
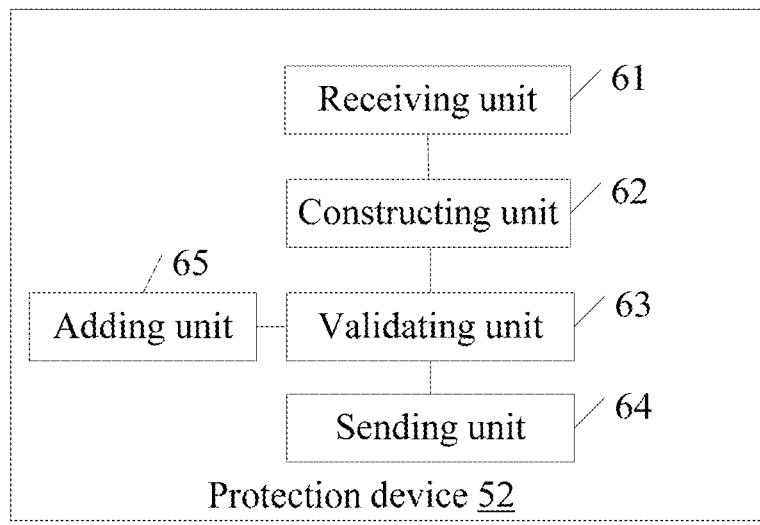
FIG. 6 illustrates a structural view of an example domain name resolution device.

FIG. 6 illustrates a schematic view of the example protection device 52. The protection device 52 may be a domain name resolution device. As shown in FIG. 6, the protection device 52 may include a receiving unit 61, a constructing unit 62, a validating unit 63, and a sending unit 64.

The receiving unit 61 may receive the first resolution request sent by the user equipment 51.

The receiving unit 61 may perform the hashing algorithm using the identification field to obtain the identification information. The identification field in the first resolution request may be an IP address of the user equipment 51. Additionally or alternatively, the identification field may include a serial number, a MAC address, or other information for uniquely identifying the user equipment 51.

The constructing unit 62 may send the canonical name CNAME response to the user equipment 51 in response to the first resolution request.

The constructing unit 62 may construct the CNAME response. For example, the CNAME response may include the identification information and a target domain name. The user equipment 51 may return a second resolution request in response to the CNAME response.

The identification information in the CNAME response may be cookie. For example, consider that the target domain name is www.example.com, the CNAME response may be cookie.www.example.com.

For example, after receiving the CNAME response, the user equipment 51 may generate the second resolution request including the CNAME response, such as including cookie.www.example.com.

The validating unit 63 may receive the second resolution request sent by the user equipment 51, and validate the identification information in the second resolution request. The second resolution request may include the identification information of the user equipment 51 and the target domain name.

The sending unit 64 may send a third resolution request to the domain name server 53, if the identification information in the second resolution request passes the validation. The third resolution request may include an indicator information, the identification information, and the target domain name. The indicator information may identify that the third resolution request is sent by the protection device 52. The domain name server 53 may identify that the third resolution request is sent by the protection device 52 based on the indicator information in the third resolution request, and subsequently resolve the target domain name in the third resolution request.

The indicator information may be a reserved bit position in a header or other portion of the identification field. The reserved bit position may be identified by a protocol being used, such as DNS protocol. In an example, the reserved bit being set to 1 may indicate that the third resolution request is a resolution request sent by the protection device 52 to the domain name server 53.

Once, the domain name server 53 determines that the third resolution request is sent by the protection device 52, the domain name server 53 may resolve the target domain name in the third resolution request if the identification information in the third resolution request passes validation. In this way, the domain name server 53 may ensure that only a resolution request sent by the protection device 52 is resolved, while a malicious attack (such as a DDOS attack) sent by an attacking device, that may not be transmitted through the protection device 52 to the domain name server 53. Thus, the resolution request sent by other devices (such as the attacking device) to the domain name server 53 may not be resolved, because the attacking device may not respond to a CNAME response sent by the protection device 52, for example, the attacking device may not transmit a resolution request in response to the CNAME response sent by the protection device 52. Thus, the malicious attack may be blocked.

Figure 7:
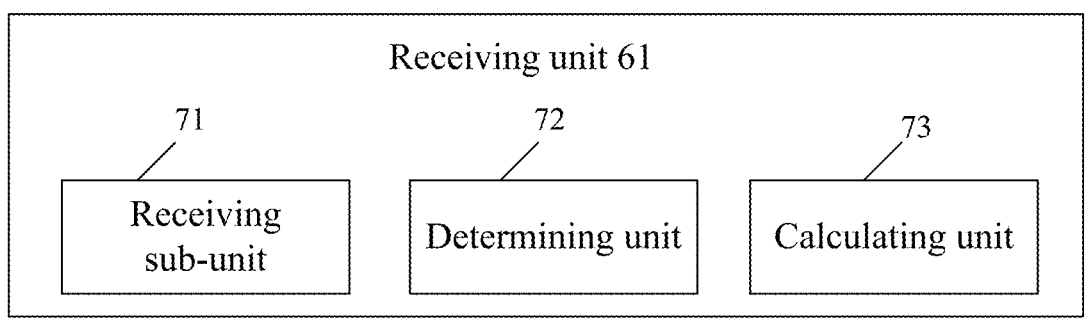
FIG. 7 illustrates a structural view of an example receiving unit.

In an example, as shown in FIG. 7, the receiving unit 61 may include a receiving sub-unit 71, a determining unit 72, and a calculating unit 73.

The receiving sub-unit 71 may receive the first resolution request for the target domain name that is transmitted by the user equipment 51.

The determining unit 72 may determine whether the first resolution request is a resolution request that is being re-sent by the user equipment 51.

The calculating unit 73 may perform the hashing algorithm on the identification field to obtain the identification information, if the determining unit 72 determines that the first resolution request is a re-sent resolution request from the user equipment 51.

The determining unit 72 may determine a time period from a receiving time point of the first resolution request to a receiving time point of the first resolution request previously sent by the user equipment 51. The determining unit may compare the time period with a pre-determined threshold. If the time period is smaller than the pre-determined threshold, the determining unit 72 may indicate that the first resolution request is a re-sent resolution request from the user equipment 51; else, the determining unit 72 may indicate that the first resolution request is not a re-sent resolution request from the user equipment 51.

For example, the user equipment 51 may transmit the first resolution request to the protection device 52 twice within a short time period. The user equipment 51 may transmit the first resolution request to the protection device 52 within the time period indicated by the predetermined threshold. The security may be improved by ensuring that the re-sent first resolution request is being used.

In an example, the protection device 52 may further include an adding unit 65. The adding unit may add the identification field from the second resolution request into a white list, if the identification information in the second resolution request passes the validation.

In this way, when the user equipment 51 sends a next resolution request, the protection device 52 may determine whether the identification field in the next resolution request matches an identification field in the white list. The protection device 52 may determine that the next resolution request is not a malicious attack without performing validation, if the identification field in the next resolution request matches an identification field in the white list; else, the protection device 52 may validate the next resolution request as described elsewhere in this document.

In an example, the sending unit 64 may perform the hashing algorithm using the identification information in the second resolution request to obtain the hash result. The sending unit 64 may compare the hash result with the identification field in the second resolution request. The sending unit 64 may determine that the identification information in the second resolution request passes the validation, if the hash result matches with the identification field.

The domain name server 53 may be an authoritative domain name server.

In the above technical solutions, only a single CNAME response is transmitted to the user equipment. In this way, the user equipment may receive only one CNAME response, which may solve the problem in the conventional technology that the user equipment may receive at least two CNAME responses and the user equipment may only respond to a first CNAME response and may not respond to a second CNAME response. Therefore, the success rate of the domain name resolution may be improved.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various components and screen display functionality is but one example of such functionality and any other configurations encompassing similar functionality are possible.

The respective logic, software, or instructions for implementing the processes, methods, and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash, or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A domain name resolution method for blocking a malicious attack on a communication network, comprising:
   receiving, by a protection device, a first resolution request from a communication equipment for a first time at a first time point, wherein the first resolution request comprises an identification field for identifying the communication equipment;
   receiving, by the protection device, the first resolution request from the communication equipment for a second time at a second time point;
   determining, by the protection device, whether a time interval between the first resolution request at the first time point and the second resolution request at the second time point is smaller than a predetermined threshold;
   in response to determining that the time interval is smaller than the predetermined threshold and receiving the first resolution request from the communication equipment twice, performing, by the protection device, a hashing using the identification field of the first resolution request to acquire an identification information of the communication equipment;
   sending, by the protection device, a canonical name (CNAME) response comprising the identification information to the communication equipment;
   receiving, by the protection device, a second resolution request from the communication equipment, wherein the second resolution request is based on the CNAME response and comprises the identification information of the communication equipment and a target domain name;
   validating, by the protection device, the identification information in the second resolution request;
   sending, by the protection device, a third resolution request for receipt by a domain name server, in response to the identification information in the second resolution request passing the validation, wherein the third resolution request comprises an indicator information, the identification information, and the target domain name, and the domain name server uses the indicator information to identify that the third resolution request is sent by the protection device and the domain name server validates the identification information in the third resolution request based on the indicator information; and
   receiving, by the protection device, from the domain name server, a network address of the target domain name included in the third resolution request, said network address received in response to the third resolution request sent by the protection device based on the indicator information.

2. The method according to claim 1, further comprising:
   in response to determining that the first resolution request is a re-sent resolution request:
   constructing, by the protection device, the CNAME response comprising the identification information and the target domain name.

3. The method according to claim 1, further comprising:
   adding, by the protection device, the identification field into a white list, in response to the identification information in the second resolution request passing the validation.

4. The method according to claim 2, further comprising:
   adding, by the protection device, the identification field into a white list, in response to the identification information in the second resolution request passing the validation.

5. The method according to claim 2, wherein the hashing using the identification field of the first resolution request is a first hashing, and the validating, by the protection device, the identification information in the second resolution request further comprises:
   performing, by the protection device, a second hashing based on the identification information in the second resolution request to acquire a hash result; and
   determining that the identification information in the second resolution request passes the validation, if the hash result matches with the identification field from the first resolution request.

6. A domain name resolution system for blocking a malicious attack on a communication network, comprising: client equipment, a protection device, and a domain name server, wherein:
   the client equipment is configured to send a first resolution request for receipt by the protection device for a first time at a first time point, wherein the first resolution request comprises an identification field for identifying the client equipment;
   the client equipment is configured to send the first resolution for receipt by the protection device for a second time at a second time point;
   the protection device is configured to determine whether a time interval between the first resolution request at the first time point and the second resolution request at the second time point is smaller than a predetermined threshold;
   in response to determining that the time interval is smaller than the predetermined threshold and receiving the first resolution request twice, the protection device is configured to perform a hashing using the identification field of the first resolution request to acquire an identification information of the client equipment and send a canonical name (CNAME) response comprising the identification information for receipt by the client equipment;
   the client equipment is further configured to send a second resolution request for receipt by the protection device, wherein the second resolution request comprises the identification information of the client equipment and a target domain name based on the CNAME response from the protection device;

the protection device is further configured to validate the identification information in the second resolution request, and send a third resolution request for receipt by the domain name server in response to the identification information in the second resolution request being successfully validated, wherein the third resolution request comprises an indicator information, the identification information, and the target domain name, and the indicator information identifies that the third resolution request is sent by the protection device; and the domain name server is configured to determine that the third resolution request is sent by the protection device based on the indicator information, validate the identification information in the third resolution request based on the indicator information and resolve the target domain name in the third resolution request.

7. The system according to claim 6, wherein:
the protection device is configured to construct the CNAME response comprising the identification information and the target domain name.

8. The system according to claim 7, wherein the protection device is further configured to add the identification field into a white list, in response to the identification information in the second resolution request being successfully validated.

9. The system according to claim 7, wherein the hashing using the identification field is a first hashing, and the protection device is further configured to:
perform a second hashing using the identification information in the second resolution request to obtain a hash result, and
determine that the identification information in the second resolution request passes the validation in response to the hash result matching the identification field.

10. A domain name resolution device for blocking a malicious attack on a communication network, comprising:
a memory storing instructions;
a processor in communication with the memory, wherein, when the processor executes the instructions, the processor is configured to cause the domain name resolution device to:
receive a first resolution request sent by a client equipment for a first time at a first time point, wherein the first resolution request comprises an identification field for identifying the client equipment;
receive the first resolution request sent by the client equipment for a second time at a second time point;
determine whether a time interval between the first resolution request at the first time point and the second resolution request at the second time point is smaller than a predetermined threshold;
in response to determining that the time interval is smaller than the predetermined threshold and receiving the first resolution request twice, perform a hashing on the identification field of the first resolution request to obtain an identification information of the client equipment;
send a canonical name (CNAME) response comprising the identification information for receipt by the client equipment;
receive a second resolution request sent by the client equipment in response to the CNAME response, and to validate an identification information in the second resolution request, wherein the second resolution request comprises the identification information of the client equipment and a target domain name; and
send a third resolution request, for receipt by a domain name server, in response to the identification information in the second resolution request being successfully validated, wherein the third resolution request includes an indicator information, the identification information, and the target domain name, and wherein the indicator information identifies that the third resolution request is sent by the domain name resolution device; and
wherein the domain name server determines that the third resolution request is sent by the domain name resolution device based on the indicator information, validates the identification information in the third resolution request based on the indicator information and in response resolves the target domain name in the third resolution request.

11. The device according to claim 10, wherein, when the processor executes the instructions, the processor is configured to cause the domain name resolution device to:
construct the CNAME response that comprises the identification information and the target domain name.

12. The device according to claim 11, wherein, when the processor executes the instructions, the processor is configured to cause the domain name resolution device to:
add the identification field into a white list in response to the identification information in the second resolution request being successfully validated.

13. The method according to claim 1, wherein the identification field comprises an address of the communication equipment.

14. The method according to claim 13, wherein the domain name server validates the identification information in the third resolution request based on the indicator information by:
performing a hashing algorithm using the identification information in the third resolution request based on the indicator information, to obtain a hash result; and
determining that the identification information in the third resolution request passes the validation in response to the hash result matching the identification field.

15. The method according to claim 14, wherein the address of the communication equipment comprises an IP address or a media access controller address of the communication equipment.

* * * * *